Sept. 7, 1937.      A. V. SAHAROFF      2,092,086
PISTON
Filed Aug. 18, 1934      3 Sheets-Sheet 1

A. V. Saharoff
INVENTOR
BY
ATTORNEY

Sept. 7, 1937.  A. V. SAHAROFF  2,092,086
PISTON
Filed Aug. 18, 1934  3 Sheets-Sheet 2

A. V. Saharoff
INVENTOR
BY
ATTORNEY

Sept. 7, 1937.    A. V. SAHAROFF    2,092,086
PISTON
Filed Aug. 18, 1934    3 Sheets-Sheet 3
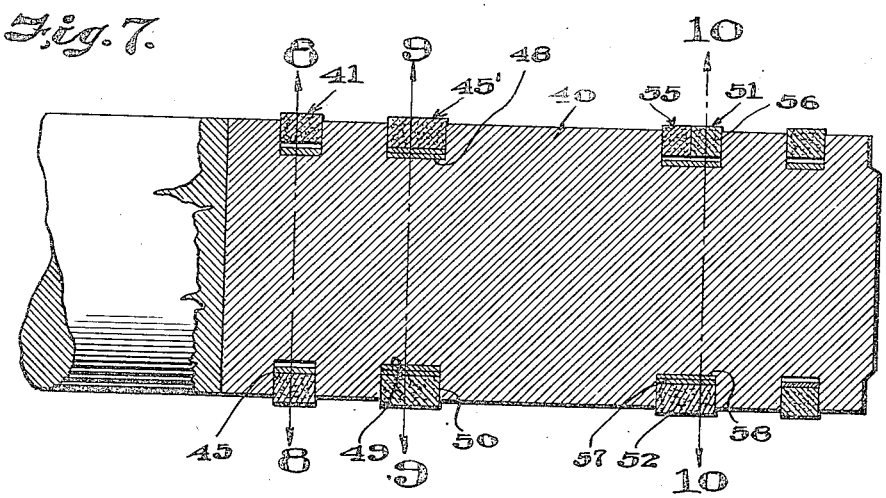
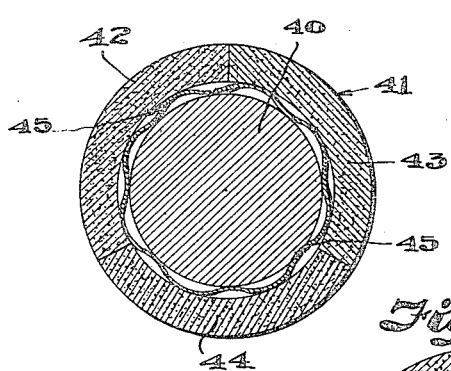
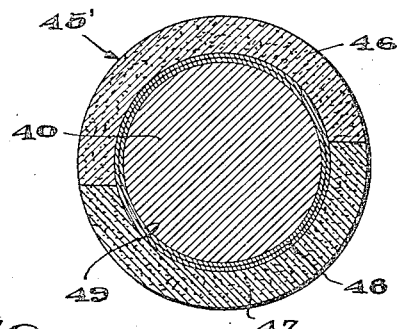
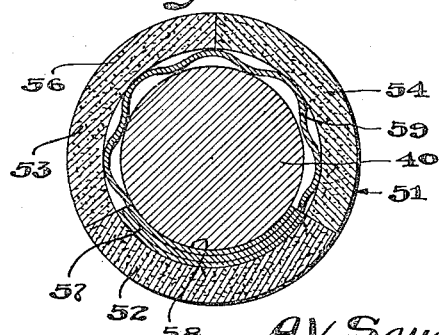
A. V. SAHAROFF.
INVENTOR
BY
ATTORNEY Patented Sept. 7, 1937

2,092,086

UNITED STATES PATENT OFFICE 2,092,086

PISTON

Alexander V. Saharoff, Buffalo, N. Y., assignor to Worthington Pump and Machinery Corporation, New York, N. Y., a corporation of Virginia Application August 18, 1934, Serial No. 740,369

5 Claims. (Cl. 309—23)

This invention relates to pistons for air or gas compressors, engines or analogous machines of the reciprocating type, and more particularly to rings for such pistons to effect a tight joint between the piston and the wall of the cylinder in which it reciprocates.

An object of the present invention is to provide detachable, replaceable piston rings of hard graphitized carbon, which not only will effect close physical contact with the cylinder walls under all temperatures of the piston and cylinder, but will serve as a lubricant, eliminating the need of employment of other lubricating mediums.

With these and other objects in view, as may appear from the accompanying specification, the invention consists of various features of construction and combination of parts, which will be first described in connection with the accompanying drawings, showing pistons of the preferred form, and the features forming the invention will be specifically pointed out in the claims.

In the drawings:

Fig. 7 is a longitudinal sectional view through a piston of the plunger type showing other modifications of the piston ring construction applied thereto.

Fig. 8 is a cross sectional view taken on the line 8—8 of Fig. 7.

Fig. 9 is a cross sectional view taken on the line 9—9 of Fig. 7.

Fig. 10 is a cross sectional view taken on the line 10—10 of Fig. 7.

Figure 1:
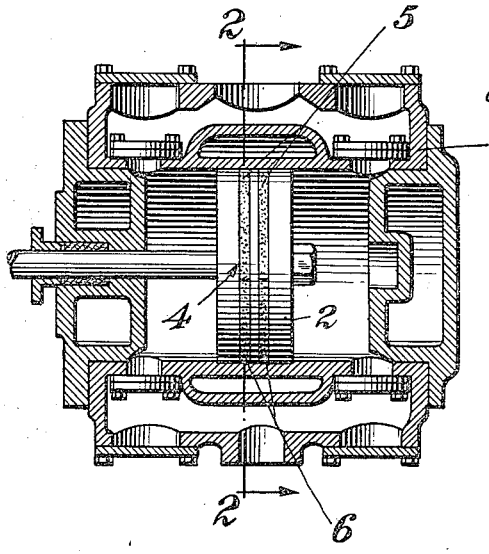
Fig. 1 is a longitudinal sectional view through the compressor showing a piston therein equipped with the improved piston rings.

Referring more particularly to the drawings, 1 indicates the cylinder of an air or gas compressor, in which the piston 2 reciprocates. While in the drawings an air or gas compressor is shown, it is to be understood that the improved piston rings forming the subject matter of the present invention may be used in connection with the pistons of any suitable type of machine, without departing from the spirit of the present invention.

Figure 2:
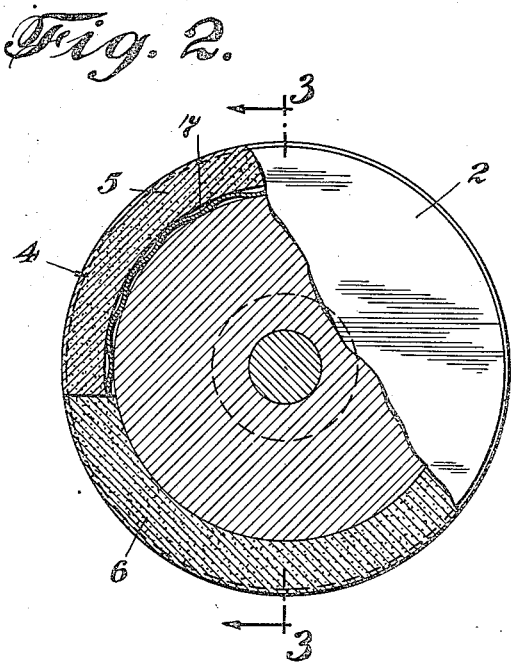
Fig. 2 is a view partly in section and partly in end elevation of the improved piston, the sectional part being taken on the line 2—2 of Fig. 1.

The piston 2 is provided with two annular grooves 3 which receive piston rings 4. Each of the piston rings 4 is composed of an upper section 5 and a lower section 6. In Fig. 2 of the drawings, it will be noted that the section 4 encircles slightly more than half of the piston. However, it is to be understood that this is an unimportant detail as the sections 5 and 6 may be made to encircle equal parts of the circumference of the piston or the section 6 may be made longer than the section 5 without departing from the spirit of the present invention. These sections 5 and 6 of the piston ring are made of hard graphitized carbon which, it is well known, has lubricating properties and these rings therefore eliminate the need of other lubricating mediums.

Figure 3:
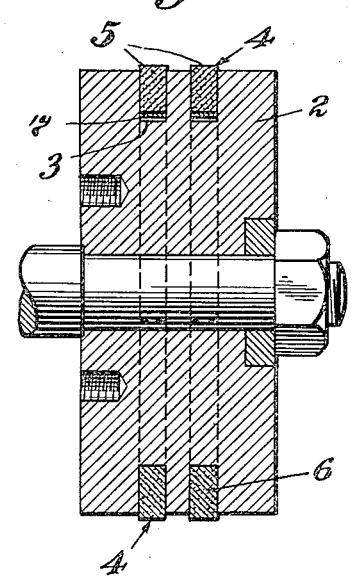
Fig. 3 is a cross sectional view through the piston taken on the line 3—3 of Fig. 1.

The carrier section 6 of the ring fits relatively snug within the groove 4 and projects slightly beyond the perimeter of the piston 2, as clearly shown in Fig. 3 of the drawings, this projection being the usual type provided by piston rings and for the purpose of forming tight joint engagement between the piston rings and the bore of the cylinder 1.

The section 5 of the ring is not quite as tight as the section 6 and it has a spring member 7 inserted between its inner edge and the inner edge or wall of the groove 3 or 4. The spring member 7 may be in any form, but is shown as sinuously curving in Fig. 2 of the drawings. This spring member 7 urges the ring section 5 outwardly into yieldable tight engagement with the wall of the bore of the cylinder 1.

Figures 4, 5:
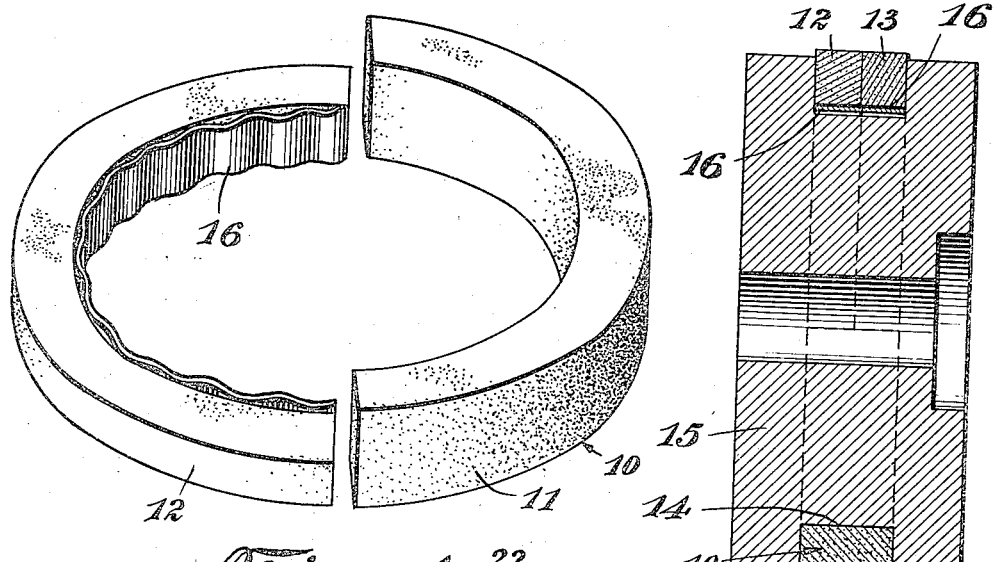
Fig. 4 is a prospective view of a part of the improved piston ring.
Fig. 5 is a longitudinal sectional view through a piston equipped with a modified form of the piston ring.
Figure 6:
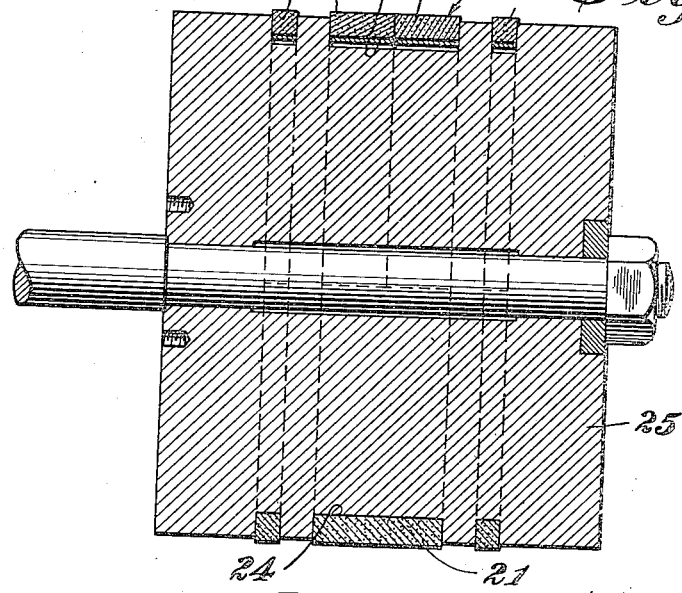
Fig. 6 is a longitudinal sectional view through a piston showing a second modification of the piston ring construction.

In Figs. 4, 5 and 6 of the drawings, modified constructions of the piston rings are shown. In these figures, the piston ring structures 10 and 20 respectively are composed of three sections. The lower section or carrier portion 11 of the ring 10 and carrier section 21 of the ring 20 are substantially twice the thickness of the sections 12 and 13 of the ring 10 and of the sections 22 and 23 of the ring 20. In other words, the lower section of the piston ring is in one piece and fits snugly within the groove 14 in the piston 15 and the groove 24 in the piston 25 while the upper halves of the respective grooves 14 and 15 are filled by the sections 12 and 13 and 22 and 23 respectively. The upper sections 12 and 13 and 22 and 23 have spring members 16 and 26 between their inner edges and the inner wall of the grooves in which the rings seat.

The construction shown in Fig. 6 differs only from the construction shown in Figs. 4 and 5 in that the piston 25 has spaced piston rings 30 therein, each of which is formed of only two sections, such as the piston rings 4 shown in Figs. 1 to 3 inclusive.

In Figs. 7 to 10 inclusive of the drawings, further modified constructions of the piston rings are shown. These latter modifications are shown in connection with a piston of the plunger type, used in compressors but it is to be understood that these modified forms may be applied to any type of reciprocating piston without departing from the spirit of the present invention.

The plunger 40 is illustrated as having four sets of rings applied thereto, which are in some instances of different types or modifications, but it is to be understood that any number of rings required may be applied and that all of the rings may be of any one of the particular constructions shown or may be all of them as desired.

The first ring 41, as shown clearly in cross section in Fig. 8 of the drawings, is a relatively narrow ring and is made up of three sections 42, 43 and 44, all of which are shown as being of substantially equal piston encircling area. If it is found desirable, however, these sections may be made of different piston encircling area without departing from the spirit of the present invention. In this first ring 41, and as shown in Fig. 8, all three of the sections 42, 43 and 44 are urged outwardly to bring their outer surfaces in contact with a cylinder (not shown) by means of a spring or springs 45 which are the same as or similar to the springs 7 and 16.

The second ring 45, shown in section in Fig. 9 of the drawings is illustrated as a wide ring and may be made in any desired number of sections, being illustrated as formed of two sections 46 and 47. The sections 46 and 47 have shims 48 between their inner perimeter and the inner wall 49 of the groove 50 formed in the piston 40, which groove receives the ring sections 46 and 47. The shims 48 are removable and additional shims may be inserted, when required to compensate for wear on the ring sections 46 and 47 so as to urge and maintain the outer surfaces of the rings or ring sections in proper engagement with the cylinder. The corresponding shims may be employed between the inner sides of the carrier ring sections 4, 6, 10 and 21 if desired without departing from the spirit of the present invention.

The third ring 51, which is shown in section in Fig. 10 of the drawings, comprises the carrier ring section 52 and the upper piston ring sections 53 and 54. Each of the ring sections 53 and 54 may be formed of two narrow sections 55 and 56 similar to the sections 12 and 13 of the ring 10. These sections 55 and 56 are substantially half the width of the carrier section 52 and each of them is shown as of the same piston encircling length. However, this feature may be varied and they may be of unequal length if desired. In Fig. 10 the carrier section 52 is illustrated as having a shim or shims 57 between its inner surface and the facing surface of the groove 58 of the piston 40 while the sections 53 and 54 have springs 59 between their inner surfaces and the facing surface of the groove 58. The springs 59 are similar to the springs 16 and 45.

The construction of piston ring heretofore described, and shown in the drawings, is particularly adaptable for use in horizontal machines in which the solid or carrier sections of the rings fit in the lower portions of the cylinders and are held by gravity in contact with the wall of the bores of the cylinders while the upper halves or sections of the rings are urged into cylinder bore engagement by the spring members.

It will be understood that this invention is not to be limited to the specific construction or arrangement of parts shown but that they may be widely modified within the invention defined by the claims.

What is claimed is:

1. A piston ring of hard graphitized carbon, composed of three sections of substantially equal piston encircling length, one of said sections being wider than the other two sections and being equal in width to the combined width of the other two sections.

2. A piston ring of hard graphitized carbon composed of a carrier section forming a part of the ring and two ring sections forming the remaining part of the ring, said carrier section being equal in width to the combined widths of said ring sections.

3. A piston ring of hard graphitized carbon composed of a carrier section forming a part of the ring and two ring sections forming the remaining part of the ring, said carrier section being equal in width to the combined widths of said ring sections, said carrier section also being thicker than said ring sections.

4. A piston ring composed of a carrier section and a pair of ring sections, said carrier section being equal in width to the combined widths of said ring sections and having end contact with the ring sections, said carrier section adapted to fit tightly in and fill the ring receiving groove of a piston and to project slightly beyond the perimeter of a piston, said ring sections adapted to fit loosely in the ring receiving groove of a piston, and spring means engaging the inner surfaces of the ring sections for urging the ring sections outwardly.

5. In combination with a piston mounted for movement in a horizontal plane and provided with a ring receiving peripheral groove, a piston ring of solid graphitized carbon including a carrier ring fitting in the lower portion of the groove and on which the piston rides, a plurality of ring sections fitting loosely in the upper portion of the groove, and means behind said ring sections to urge them outwardly, said carrier section being equal in width to the combined widths of the ring sections.

ALEXANDER V. SAHAROFF.